United States Patent
Cheung et al.

(10) Patent No.: US 8,577,394 B2
(45) Date of Patent: Nov. 5, 2013

(54) SECURITY MANAGEMENT SYSTEM AND METHOD

(75) Inventors: Ho-Leung Cheung, Santa Clara, CA (US); Jia-Lin Chen, New Taipei (TW); Chun-Wen Wang, New Taipei (TW); Chia-Hung Chien, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/340,647

(22) Filed: Dec. 29, 2011

(65) Prior Publication Data
US 2013/0130650 A1    May 23, 2013

(30) Foreign Application Priority Data
Nov. 18, 2011 (TW) .............................. 100142454 A

(51) Int. Cl.
*H04W 24/00* (2009.01)
*H04M 1/68* (2006.01)

(52) U.S. Cl.
USPC .................. 455/456.4; 455/456.1; 455/410; 455/414.1

(58) Field of Classification Search
USPC .............................. 455/456.1–457, 410, 411; 340/5.8–5.86; 342/44–45; 356/71
See application file for complete search history.

(56) References Cited

U.S. PATENT DOCUMENTS

| | | | | |
|---|---|---|---|---|
| 6,011,973 | A * | 1/2000 | Valentine et al. | 455/456.6 |
| 6,625,455 | B1 * | 9/2003 | Ariga | 455/456.1 |
| 6,657,538 | B1 * | 12/2003 | Ritter | 340/5.81 |
| 2002/0106202 | A1 * | 8/2002 | Hunter | 396/56 |
| 2003/0125014 | A1 * | 7/2003 | Inukai et al. | 455/410 |
| 2003/0133573 | A1 * | 7/2003 | Himmel et al. | 380/258 |
| 2003/0182242 | A1 * | 9/2003 | Scott et al. | 705/65 |
| 2004/0169076 | A1 * | 9/2004 | Beale et al. | 235/382 |
| 2005/0007456 | A1 * | 1/2005 | Lee et al. | 348/207.99 |
| 2005/0059339 | A1 * | 3/2005 | Honda et al. | 455/3.01 |
| 2005/0064856 | A1 * | 3/2005 | Atkin et al. | 455/418 |
| 2005/0181808 | A1 * | 8/2005 | Vaudreuil | 455/456.3 |
| 2005/0258250 | A1 * | 11/2005 | Melick et al. | 235/462.46 |
| 2006/0135140 | A1 * | 6/2006 | Rothman et al. | 455/418 |
| 2008/0267614 | A1 * | 10/2008 | Boss et al. | 396/429 |

\* cited by examiner

*Primary Examiner* — Lester Kincaid
*Assistant Examiner* — Daniel Lai
(74) *Attorney, Agent, or Firm* — Altis & Wispro Law Group, Inc.

(57) ABSTRACT

A security management system is provided. The security management system includes a storage unit and at least one processor. The storage unit stores a restricting table which records relationships between positional information of a mobile device and functions of the mobile device. The at least one processor includes an information module, a restricting module and a disabling module. The information module provides positional information of the mobile device. The restricting module generates a restricting instruction according to the provided positional information of the mobile device and the restricting table. The disabling module disables the corresponding functions of the mobile device according to the generated restricting instruction.

10 Claims, 3 Drawing Sheets

SECURITY MANAGEMENT SYSTEM AND METHOD

BACKGROUND

1. Technical Field

The present disclosure relates to management systems and, particularly, to a security management system and a security management method.

2. Description of Related Art

When a user with a mobile device enters a special area, such as a laboratory, the user may, without authorization, acquire some classified data in the laboratory using the mobile device. The acquired data may then be uploaded to a network by the user, which can result in the secure data being leaked.

Therefore, what is needed is a security management system and a method to overcome the described limitations.

DETAILED DESCRIPTION

Figure 1:
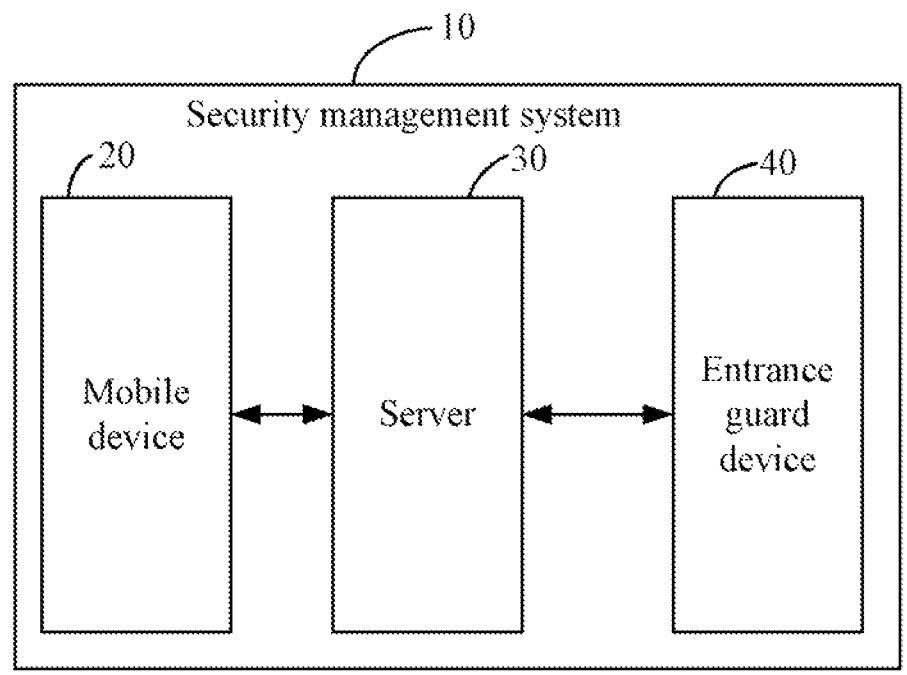
FIG. 1 is a schematic diagram of a security management system, including a mobile device, a server and an entrance guard device, in accordance with an exemplary embodiment.

FIG. 1 shows a security management system 10 which is applied in a hardware environment which includes a mobile device 20 and a server 30. The mobile device 20 is connected to the server 30 by a wireless or a wire connection.

Figure 2:
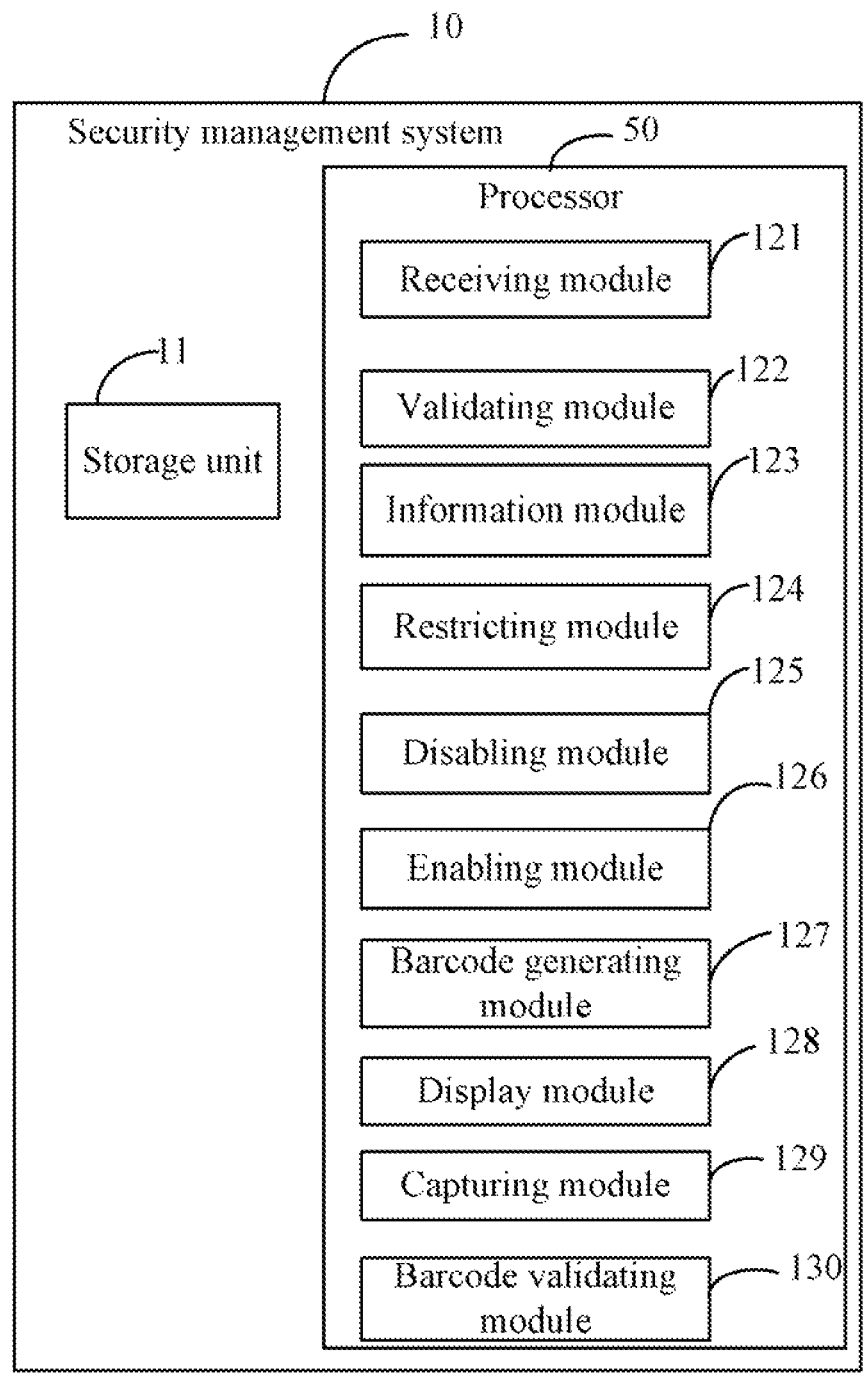
FIG. 2 is a block diagram of the hardware infrastructure of the security management system of FIG. 1, in accordance with an exemplary embodiment.

Referring to FIG. 2, the security management system 10 includes a storage unit 11 and at least one processor 50. The at least one processor 40 includes an information module 123, a restricting module 124, and a disabling module 125. The storage unit 11 stores a restricting table, which records relationships between positional information of the mobile device 20 and functions of the mobile device 20.

The information module 123 which can be invoked/implemented by the at least one processor 50 to provide current positional information of the mobile device 20. The restricting module 124 which can be invoked/implemented by the at least one processor 50 to generate a restricting instruction according to the current positional information of the mobile device 20 and the restricting table. The disabling module 125 which can be invoked/implemented by the at least one processor 50 to disable the corresponding functions of the mobile device according to the restricting instruction. In one embodiment, the information module 123 may be a global position system (GPS) or an assisted global positioning system (AGPS).

In a first embodiment, the information module 123 and the disabling module 125 are incorporated into the mobile device 20, the restricting table is stored in the server 30, and the restricting module 124 is incorporated into the server 30. For example, when a user with a mobile device 20 enters a laboratory in where the user is forbidden from capturing images. The information module 123 which can be invoked/implemented by the at least one processor 50 to provide the positional information of the mobile device 20 to the server 30. The restricting module 124 which can be invoked/implemented by the at least one processor 50 to generate a restricting instruction for forbidding the capturing of images according to the current positional information of the mobile device 20 and the restricting table. The disabling module 125 which can be invoked/implemented by the at least one processor 50 to disable the capturing function of the mobile device 20 according to the restricting instruction, thereby preventing important data in the laboratory from being revealed. In other embodiment, the information module 123, the restricting module 124 and the disabling module 125 will be incorporated into the mobile device 20 or the server if needed.

Furthermore, the restricting table records relationships between a combination of the positional information and a user permission level of the mobile device 20 and the functions of the mobile device 20. The information module 123 which can be invoked/implemented by the at least one processor 50 to further provide a user permission level of the mobile device 20. The restricting module 124 which can be invoked/implemented by the at least one processor 50 to further generate a restricting instruction according to the positional information of the mobile device 20, the user permission level of the mobile device 20, and the restricting table. For example, if the user permission level of the mobile device 20 is highest, the restricting module 124 will not generate any restricting instruction to disable the functions of the mobile device 20 even if the mobile device 20 is moved. If the user permission level of the mobile device 20 is higher or lower, the restricting module 124 will generate the restricting instruction according to the positional information and the user permission level of the mobile device 20, and the restricting table. The disabling module 125 will disable the corresponding functions of the mobile device 20 according to the restricting instruction.

Furthermore, the storage unit 11 stores a number of predetermined user's characters, such as, a user's fingerprint, a user's pupil, a user's voice, a user's facial characters, or a combination thereof. The at least one processor 50 further includes further includes a receiving module 121 and a validating module 122. The receiving module 121 which can be invoked/implemented by the at least one processor 50 to receive a user's character input from the user of the mobile device 20. The validating module 122 which can be invoked/implemented by the at least one processor 50 to validate whether the received user's character is one of the predetermined user's characters stored in the storage unit 11. The information module 123 which can be invoked/implemented by the at least one processor 50 to provide the positional information of the mobile device 20 when the received user's character is one of the predetermined user's characters stored in the storage unit 11. In one embodiment, the receiving module 121 and the validating module 122 are incorporated into an entrance guard device 40. For example, when the user with the mobile device 20 appears in the front of the entrance guard device 40, the receiving module 121 which can be invoked/implemented by the at least one processor 50 to receive the user's character, and the validating module 122 validates whether the received user's character is one of the predetermined user's characters stored in the storage unit 11. The entrance guard device 40 will allow the user with the mobile device 40 to enter, and generate an instruction to control the information module 123 to provide the positional information of the mobile device 20 when the received user's character is one of the predetermined user's characters stored in the storage unit 11. The restricting module 124 which can be invoked/implemented by the at least one processor 50 to generate the restricting instruction according to the provided positional information of the mobile device 20 and the restricting table. The disabling module 125 which can be invoked/implemented by the at least one processor 50 to disable the corresponding functions of the mobile device 20 according to the generated restricting instruction.

Furthermore, the at least one processor 50 includes a barcode generating module 127, a display module 128, a capturing module 129, and a barcode validating module 130. The barcode generating module 127 which can be invoked/implemented by the at least one processor 50 to randomly generate a barcode. The display module 128 which can be invoked/implemented by the at least one processor 50 to display the generated barcode. The capturing module 129 which can be invoked/implemented by the at least one processor 50 to capture the displayed barcode, and uploads the captured barcode. The barcode validating module 130 which can be invoked/implemented by the at least one processor 50 to validate whether the uploaded barcode is the barcode randomly generated by the barcode generating module 127. The information module 123 which can be invoked/implemented by the at least one processor 50 to provide the positional information of the mobile device 20 when the uploaded barcode is the barcode randomly generated by the barcode generating module 127. The restricting module 124 which can be invoked/implemented by the at least one processor 50 to generate the restricting instruction according to the provided positional information of the mobile device 20 and the restricting table. The disabling module 125 which can be invoked/implemented by the at least one processor 50 to disable the corresponding functions according to the generated restricting instruction. In one embodiment, the barcode generating module 127 and the display module 128 are incorporated into the entrance guard device 40. The capturing module 129 and the disabling module 125 are incorporated into the mobile device 20. The barcode validating module 130 and the restricting module 124 are incorporated into the server 30. In other embodiment, the barcode generating module 127, the display module 128 and the disabling module 125 are incorporated into the mobile device 20, the capturing module 129 is incorporated into the entrance guard device 40, and the barcode validating module 130 and the restricting module 124 are incorporated into the server 30.

Furthermore, the at least one processor 50 includes a enabling module 126. When the mobile device 20 is moved to a new position, the information module 123 which can be invoked/implemented by the at least one processor 50 to provide the new positional information of the mobile device 20, and the restricting module 124 which can be invoked/implemented by the at least one processor 50 to generate another restricting instruction according to the new positional information and the restricting table. The disabling module 125 which can be invoked/implemented by the at least one processor 50 to disable other functions of the mobile device 20 according the restricting instruction. The enabling module 126 which can be invoked/implemented by the at least one processor 50 to enable the disabled functions of the mobile device 20 when the mobile device 20 is moved to the new position. For example, when the user with the mobile device 20 enters the laboratory, the disabling module 125 which can be invoked/implemented by the at least one processor 50 to disable the capturing function of the mobile device 20, and when the user with the mobile device 20 goes out of the laboratory, the enabling module 126 which can be invoked/implemented by the at least one processor 50 to enable the capturing function. The disabling module 125 will also disable other functions, such as a communicating function, for example.

Figure 3:
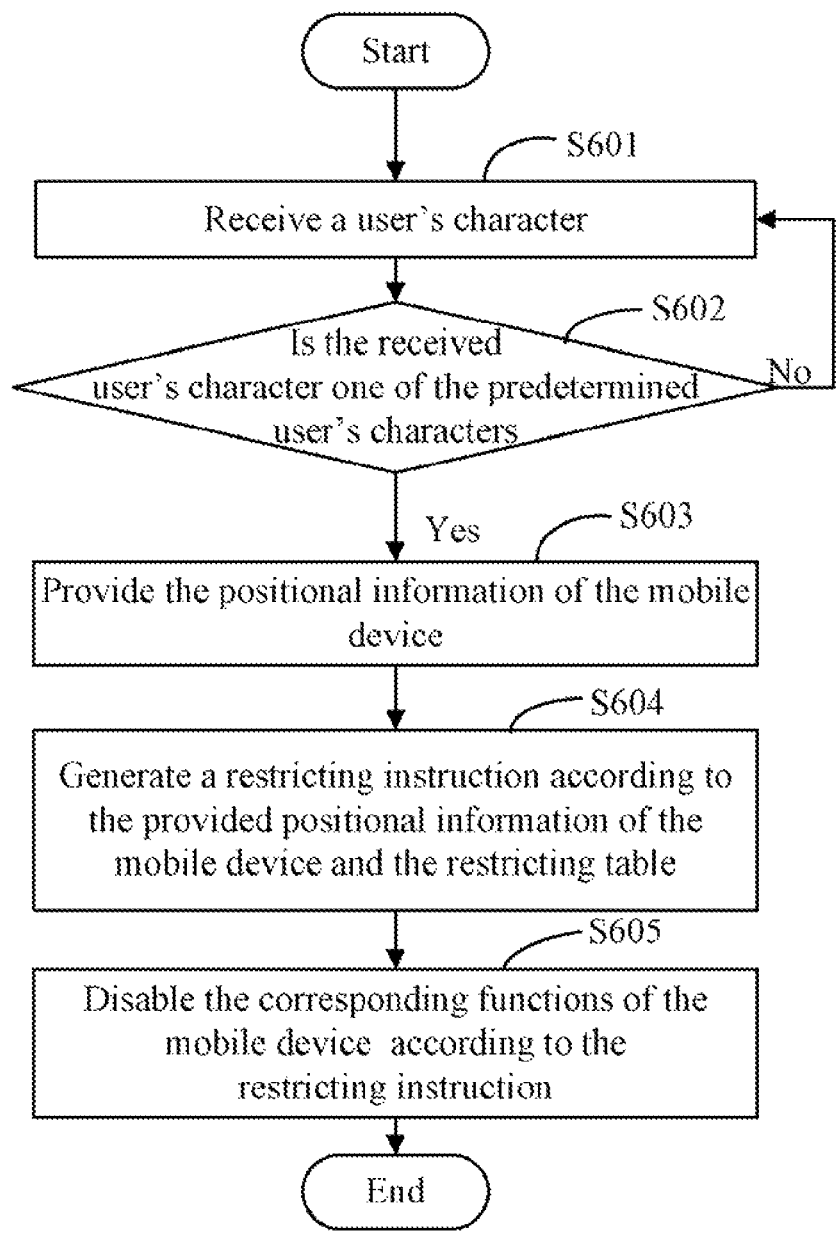
FIG. 3 is a flowchart of a security management method implemented by the security management system of FIG. 2, in accordance with an exemplary embodiment.

FIG. 3 is a flowchart of a security management method implemented by the security management system of FIG. 2, in accordance with an exemplary embodiment.

In step S601, the receiving module 121 which can be invoked/implemented by the at least one processor 50 to receive the user's character.

In step S602, the validating module 122 which can be invoked/implemented by the at least one processor 50 to validate whether the received user's character is one of the predetermined user's characters, if yes, the procedure goes to step S603, if no, the procedure goes to step S601.

In step S603, the information module 123 which can be invoked/implemented by the at least one processor 50 to provide the positional information of the mobile device 20.

In step S604, the restricting module 124 which can be invoked/implemented by the at least one processor 50 to generate a restricting instruction according to the provided positional information of the mobile device 20 and the restricting table.

In step S605, the disabling module 125 which can be invoked/implemented by the at least one processor 50 to disable the corresponding functions of the mobile device 20 according to the restricting instruction.

The method further includes the following steps: the receiving module 121 which can be invoked/implemented by the at least one processor 50 to receive a barcode input by the user, the validating module 122 which can be invoked/implemented by the at least one processor 50 to validate whether the received barcode is the barcode being randomly generated by the server 30. The information module 123 which can be invoked/implemented by the at least one processor 50 to provide the positional information of the mobile device 20 when the input barcode is the barcode being randomly generated by the barcode generating module 127, the restricting module 124 which can be invoked/implemented by the at least one processor 50 to generate the restricting instruction according to the provided positional information of the mobile device 20 and the restricting table. And the disabling module 125 which can be invoked/implemented by the at least one processor 50 to disable the corresponding functions according to the generated restricting instruction.

The method further includes the following steps: the enabling module 126 which can be invoked/implemented by the at least one processor 50 to enable the disabled functions of the mobile device 20 when the mobile device 20 is moved to another position.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A security management system applied among a mobile device, a server, and an entrance guard device, the security management system comprising:
   a storage unit configured to store a restricting table, which records relationships between positional information of the mobile device and functions of a mobile phone; and
   at least one processor comprising:
   a barcode generating module configured to randomly generate a barcode by the entrance guard device when the mobile device is moved adjacent to the entrance guard device;
   a display module configured to display the generated barcode on the entrance guard device;

a capturing module configured to capture the displayed barcode, and upload the captured barcode to the server by the mobile device;

a barcode validating module configured to validate whether the uploaded barcode is the barcode randomly generated by the barcode generating module by the sever;

an information module configured to provide positional information of the mobile device when the uploaded barcode is the barcode randomly generated by the barcode generating module;

a restricting module configured to generate a restricting instruction according to the provided positional information of the mobile device and the restricting table stored in the storage unit; and a disabling module configured to disable the corresponding functions of the mobile device according to the generated restricting instruction.

2. The security management system as described in claim 1, wherein the at least one processor further comprises an enabling module which is configured to enable the disabled functions of the mobile device when the mobile device is moved to other positions.

3. The security management system as described in claim 1, wherein the restricting table further records relationships between a combination of the positional information and a user permission level of the mobile device and the functions of the mobile device, the information module is further configured to provide the user permission level of the mobile device, and the restricting module is further configured to generate the restricting instruction according to the positional information of the mobile device, the user permission level of the mobile device and the restricting table.

4. The security management system as described in claim 3, wherein the storage unit further stores a plurality of predetermined user's characters, and the at least one processor further comprises:

a receiving module configured to receive a user's character input from a user of the mobile device;

a validating module configured to validate whether the received user's character is one of predetermined user's characters stored in the storage unit; and the information module configured to provide the positional information of the mobile device when the received user's character is one of the predetermined user's characters.

5. The security management system as described in claim 4, wherein the user's character is a user's fingerprint, a user's pupil, a user's voice, a user' facial characters, or a combination thereof.

6. A security management method applied among a mobile device, a server, and an entrance guard device, the security management method comprising:

providing a storage unit to store a restricting table, which records relationships between positional information of the mobile device and functions of the mobile phone; and providing at least one processor for implementing following steps:

randomly generating a barcode by the entrance guard device when the mobile device is moved adjacent to the entrance guard device;

displaying the generated barcode on the entrance guard device;

capturing the displayed barcode, and uploading the captured barcode to the server by the mobile device;

validating whether the uploaded barcode is the barcode being randomly generated by the server;

providing positional information of the mobile device when the uploaded barcode is the barcode being randomly generated;

generating a restricting instruction according to the provided positional information of the mobile device and the restricting table stored in the storage unit; and disabling the corresponding functions of the mobile device according to the generated restricting instruction.

7. The security management method as described in claim 6, further comprising:

enabling the disabled functions of the mobile device when the mobile device is moved to other positions.

8. The security management method as described in claim 6, wherein the restricting table further records relationships between a combination of the positional information and a user permission level of the mobile device and the functions of the mobile device, the method further comprising:

providing the user permission level of the mobile device; and generating the restricting instruction according to the positional information of the mobile device, the user permission level of the mobile device and the restricting table.

9. The security management method as described in claim 8, wherein the storage unit further stores a plurality of predetermined user's characters, the method further comprising:

receiving a user's character input by a user of the mobile device;

validating whether the received user's character is one of predetermined user's characters stored in the storage unit; and providing the positional information of the mobile device when the received user's character is one of the predetermined user's characters.

10. The security management method as described in claim 9, wherein the user's character is a user's fingerprint, a user's pupil, a user's voice, a user's facial characters, or a combination thereof.

* * * * *